United States Patent [19]
Lee

[11] Patent Number: 5,844,332
[45] Date of Patent: Dec. 1, 1998

[54] CYLINDRICAL LINEAR MOTOR HAVING INDIVIDUALLY TOOTHED LAMINATED PRIMARY CORES

[75] Inventor: Geun-Ho Lee, Changwon, Rep. of Korea

[73] Assignee: LG Industrial Systems Co., Ltd., Seoul, Rep. of Korea

[21] Appl. No.: 785,552

[22] Filed: Jan. 21, 1997

[30] Foreign Application Priority Data

Jan. 27, 1996 [KR] Rep. of Korea .................... 1996/1821

[51] Int. Cl.$^6$ .................................................. H02K 41/02
[52] U.S. Cl. ............................... 310/12; 310/13; 310/14; 310/216; 310/217; 310/218; 127/250; 127/289
[58] Field of Search ................... 310/216, 12, 13, 310/14, 254, 252, 217, 218; 318/135; 187/250, 289

[56] References Cited

U.S. PATENT DOCUMENTS

| 607,609 | 7/1898 | Short ........................................ 310/216 |
| 4,217,513 | 8/1980 | Kohzai et al. ........................... 310/186 |
| 4,912,353 | 3/1990 | Kondo et al. ............................ 310/259 |

FOREIGN PATENT DOCUMENTS

| 567150 | 10/1993 | European Pat. Off. ................. 310/12 |
| U-51-7605 | 1/1976 | Japan . |
| U-53-163507 | 12/1978 | Japan . |
| U-4-124887 | 11/1992 | Japan . |
| 7-222426 | 8/1995 | Japan ..................................... 310/12 |
| 300286 | 11/1995 | Japan ..................................... 310/12 |

Primary Examiner—Clayton E. Laballe
Assistant Examiner—Karl Eizo Tamai
Attorney, Agent, or Firm—Oliff & Berridge, PLC

[57] ABSTRACT

An improved cylindrical linear motor is capable of being more easily assembled by changing the constructions of a primary iron core and a primary coil and significantly preventing an over-heating of the primary coil. The motor includes primary toothed sections formed of stacked steel plates, with the primary toothed sections being spaced-apart from one another, a supporting member formed to support the primary toothed sections, coils wound onto the supporting member and between the primary toothed sections, a yoke formed of stacked steel plates and engaged to the primary toothed sections between which the coils are wound, and a secondary iron core inserted within the primary iron cores.

4 Claims, 7 Drawing Sheets ical linear motor, FIG. 2 is a
CYLINDRICAL LINEAR MOTOR HAVING INDIVIDUALLY TOOTHED LAMINATED PRIMARY CORES

BACKGROUND OF THE INVENTION

1. Field of the Invention

The present invention relates to a cylindrical linear motor, and in particular to an improved cylindrical linear motor which is more easily assembled by changing the construction of a primary iron core and coils and significantly prevents an overheating of the coils.

2. Description of the Conventional Art

Generally, a linear motor is used for a system which needs a linear movement. Recently, the linear motor is widely used for an elevator system. The cylindrical linear motor which is used for an elevator includes short primary cores radially disposed around a long secondary core.

FIG. 1 is a perspective view illustrating a primary iron core of a conventional cylindrical linear motor, FIG. 2 is a plan view illustrating primary coils of the conventional cylindrical linear motor, and FIG. 3 is a cross-sectional view illustrating the conventional cylindrical linear motor.

As shown therein, the conventional cylindrical linear motor 20 includes toothed primary iron cores 1 formed of stacked Si-steel plates, coils 8 inserted between each primary toothed section 4, and a secondary iron core 9.

The primary iron cores 1 are formed of stacked Si-steel plates bound by using a bolt 2 and a nut 11. A plurality of spaced-apart primary toothed sections 4 are extended from a yoke 3, and the coils 8 are wound in the slots 5 formed between the primary toothed sections 4. An arcuate concave groove portion 6 is formed in the inner side of each primary iron core 1 and conforms with the outer circumferential surface of the secondary iron core 9. An arcuate convex portion 7 is formed in the outer side of each primary iron core 1.

The coils 8 are formed to be flat and ring-shaped and are varnished, and the secondary iron core 9 is made of a steel pipe or a rod covered with aluminum.

The assembling order of the conventional cylindrical linear motor 20 will now be explained with reference to the accompanying drawings.

First, the primary iron cores 1 are arranged together, the coils 8 are then inserted between each primary toothed section 4, and the secondary iron core 9 is inserted into a hole defined by the co-centrally arranged primary cores 1.

The operation of the cylindrical linear motor 20 will now be explained.

When a current is applied to the coils 8, a magnetic field is generated by the primary iron core 1. The thusly generated magnetic field moves in the longitudinal direction of the secondary iron core 9 after a predetermined time.

As the moving magnetic field is formed, an induction electric force is generated by the aluminum conductive material 10 of the secondary iron core 9, and a spiral current is formed in the circumferential direction of the secondary iron core 9.

In other words, the magnetic fields generated by the primary toothed sections 4 of the primary iron core 1 due to the current being applied to the coils 8 generate an induction electric force by the aluminum conductive material 10 of the secondary iron core 9, which passes through the primary toothed sections 4, surrounds the yoke 3 of the primary iron core 1, and passes through the primary toothed sections 4.

As the magnetic field flow is alternately changed based on the lapse of time, a voltage is generated by the aluminum conductive material 10, for thus generating a current, and the current generates a predetermined force in cooperation with the magnetic field generated by the coils 8, so that the secondary iron core 9 and the primary iron core 1 are linearly disposed relative one another.

However, when inserting the coils 8 between the primary toothed sections 4, frictions occur between the coils 8 and the primary toothed sections 4, thus damaging the coils 8, so that the insulation of the motor may not be achieved.

In addition, since the coils 8 are formed to be flat and are made of copper, and the ratio of the cross-sectional area of the copper cable per area of the coils is very low, it is impossible to wind much coils. Therefore, the primary resistance is increased, thus damaging the motor due to overheating. In addition, since the widths and lengths of the copper cables are not various, the width of the slot 5 is limited, thus causing problems.

In addition, when fabricating the linear motor which needs to generate a large force, the primary iron core 1 may be made deeper. Therefore, it is difficult to manufacture the primary toothed sections 4. Furthermore, since the primary toothed sections 4 are made longer, the primary toothed sections 4 are easily bent.

SUMMARY OF THE INVENTION

Accordingly, it is an object of the present invention to provide a cylindrical linear motor which overcomes the aforementioned problems encountered in the conventional art.

It is another object of the present invention to provide an improved cylindrical linear motor which is capable of more easy assembly by changing the constructions of a primary iron core and coils and significantly preventing an overheating of the coils.

To achieve the above objects, there is provided a cylindrical linear motor which includes a plurality of primary toothed sections formed of stacked steel plates, with the primary toothed sections being spaced-apart from one another, a supporting member supporting the primary toothed sections, coils wound onto the supporting member and between the primary toothed sections, a yoke formed of stacked steel plates and engaged to the primary toothed sections between which the coils are wound, and a secondary iron core inserted into the primary iron core having the yoke and the primary toothed sections.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
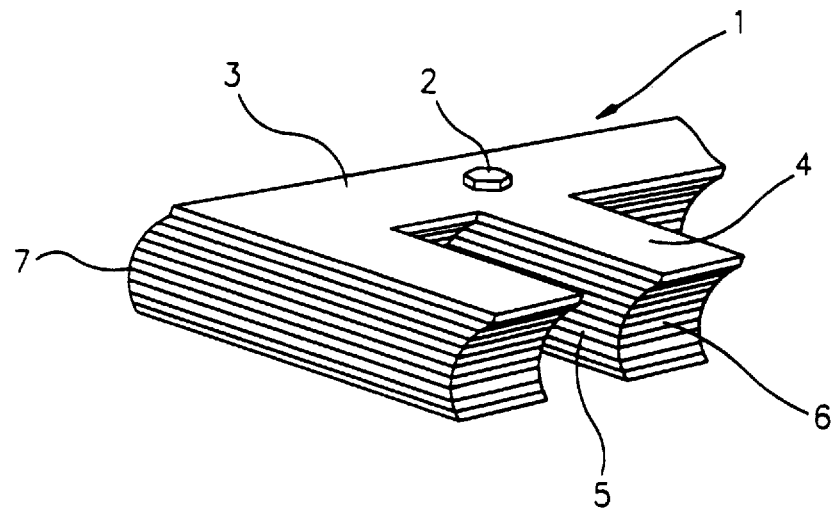
FIG. 1 is a perspective view illustrating a primary iron core of a conventional cylindrical linear motor.
Figure 2:
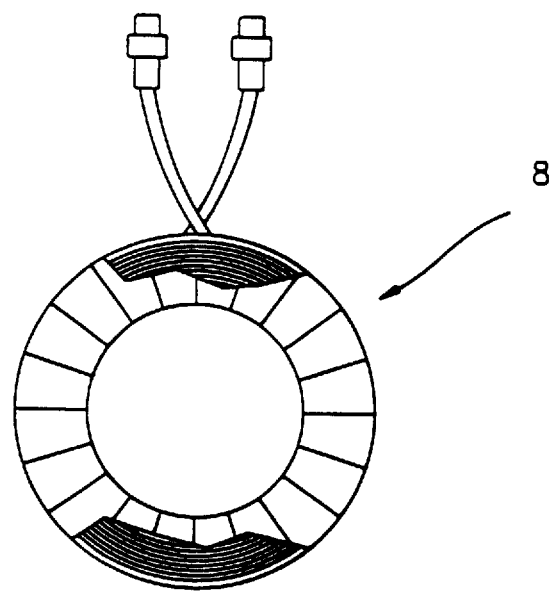
FIG. 2 is a front view illustrating coils of the conventional cylindrical linear motor.
Figure 3:
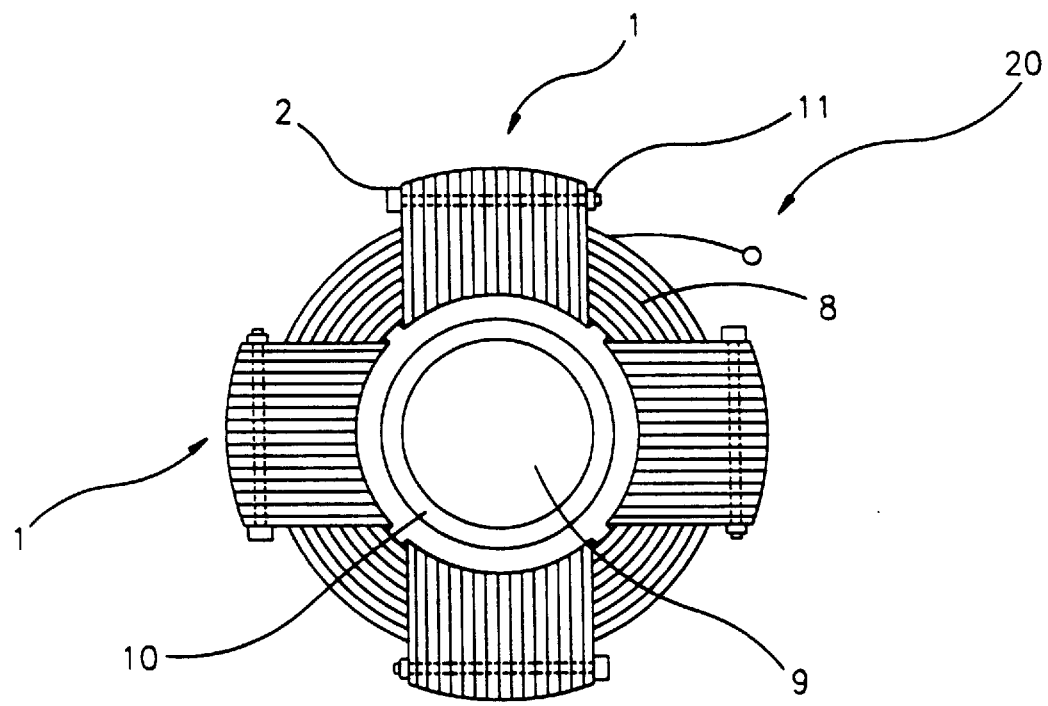
FIG. 3 is a cross-sectional view illustrating the conventional cylindrical linear motor.
Figure 4:
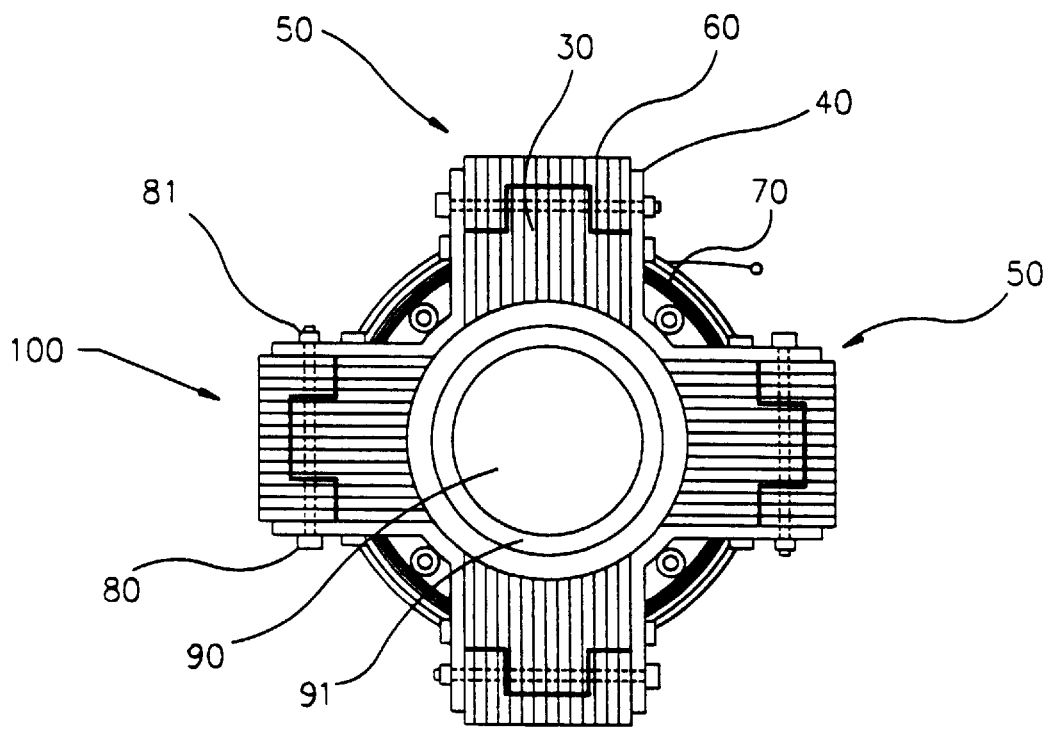
FIG. 4 is a cross-sectional view illustrating a cylindrical linear motor according to the present invention.

FIG. 4 is a cross-sectional view illustrating a cylindrical linear motor according to the present invention.

As shown therein, the cylindrical linear motor 100 includes a plurality of radially arranged primary iron cores 50 each having a plurality of primary toothed sections 30 and a yoke 60, a plurality of supporting members 40 for supporting the primary iron cores 50, a plurality of coils 70 wound onto the primary iron cores 50, and a secondary iron core 90 inserted into a hole formed in the center of the primary iron cores 50.

Figure 5A:
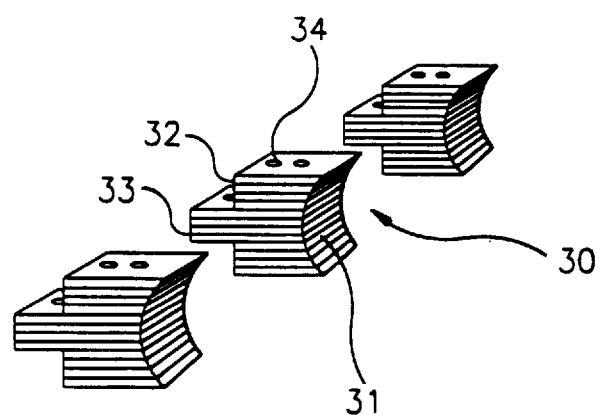
Figure 5A is a perspective view illustrating primary toothed sections of the cylindrical linear motor according to a first embodiment of the present invention.

FIG. 5A is a perspective view illustrating three of the primary toothed sections 30 of the cylindrical linear motor according to a first embodiment of the present invention.

As shown therein, an arcuate concave portion 31 is formed in one side of each of the primary toothed sections 30 to conform with the outer circumferential surface of the secondary iron core 90, and an engaging portion 32 is formed at another side of each of the primary toothed sections 30 to engage with the yoke 60. A protrusion portion 33 is extended from each engaging portion 32, and a plurality of mounting holes 34 are formed to vertically pass through the primary toothed sections 30 to allow them to be engaged with the supporting members 40.

Figure 5B:
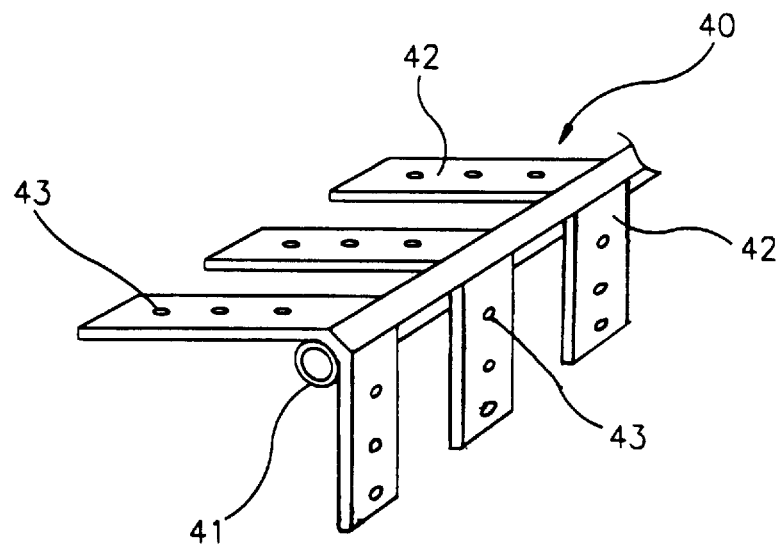
FIG. 5B is a perspective view illustrating a supporting member of the cylindrical linear motor according to the first embodiment of the present invention.

FIG. 5B is a perspective view illustrating a supporting member of the cylindrical linear motor according to the first embodiment of the present invention.

The supporting member 40 includes a pipe 41 having a predetermined length with a plurality of spaced-apart right-angled engaging arms 42 attached to the pipe 41, and a plurality of mounting holes 43 are formed in each engaging arm 42.

In particular, the pipe 41 serves to radiate the heat generated by the coils 70 wound between the engaging arms 42 of the supporting member 40 and the primary toothed sections 30 and prevents the coils 70 from being bent toward the secondary iron core 90.

Figure 5C:
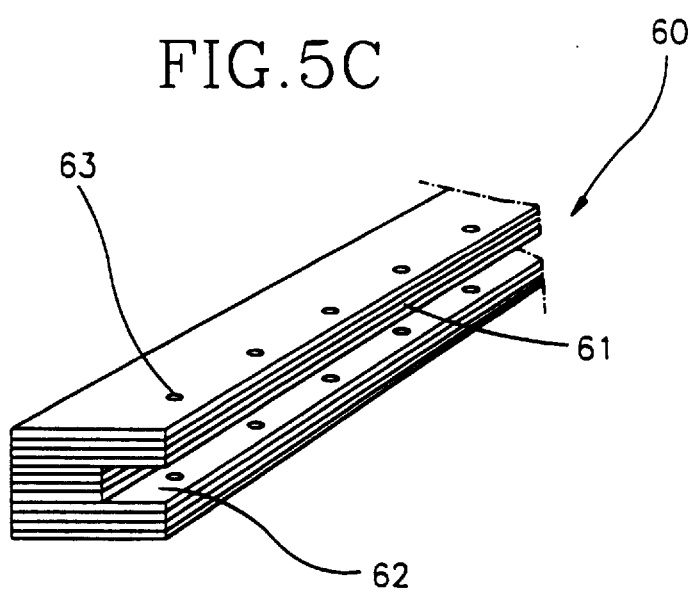
Figure 5C is a perspective view illustrating a yoke of the cylindrical linear motor according to the first embodiment of the present invention.

FIG. 5C is a perspective view illustrating a yoke 60 of the cylindrical linear motor according to the first embodiment of the present invention. As shown therein, the yoke 60 is formed of stacked steel plates.

In more detail, the yoke 60 includes an engaging section 61, to which the engaging portion 32 of the primary toothed section 30 is matched, having a plurality of mounting holes 63 for allowing the yoke 60 to be engaged with the engaging arms 42 of the supporting member 40, and a longitudinal groove 62 into which the protrusion portions 33 of the primary toothed sections 30 are inserted.

Figure 6:
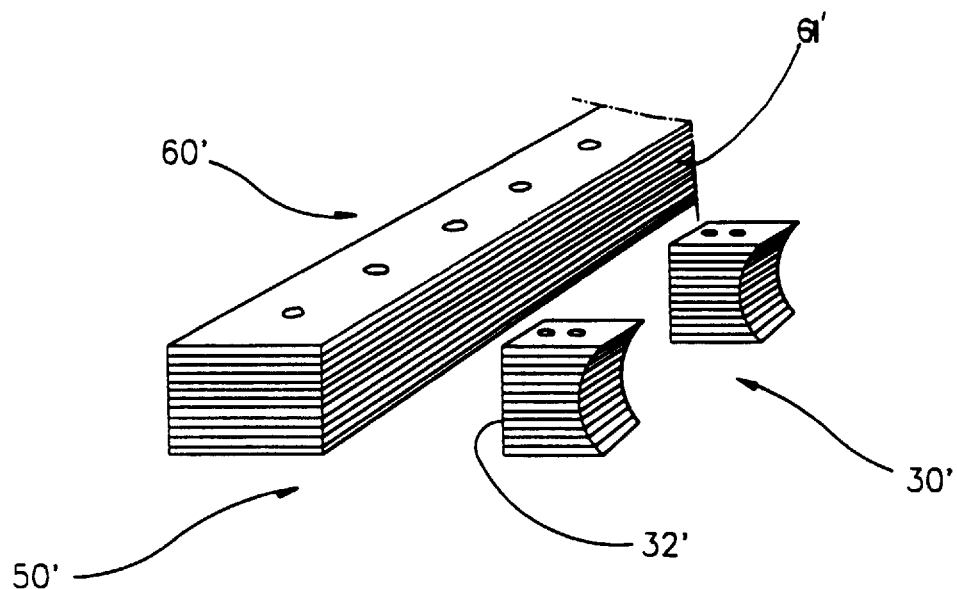
FIG. 6 is a perspective view illustrating primary toothed sections and a yoke of a cylindrical linear motor according to a second embodiment of the present invention.

FIG. 6 is a perspective view illustrating a pair of primary toothed sections 32' and a yoke 60' of a primary core group 60' of a cylindrical linear motor according to a second embodiment of the present invention.

The constructions of the primary toothed sections and the yoke according to the second embodiment of the present invention are the same as the first embodiment of the present invention except for the following elements.

A flat engaging portion 32' of each primary toothed section 30' is formed by the ends of the stacked steel plates, and an engaging portion 61' of the yoke 60' is formed to be flat for being engaging with the flat engaging portions 32' of the primary toothed sections 30'.

Figure 7:
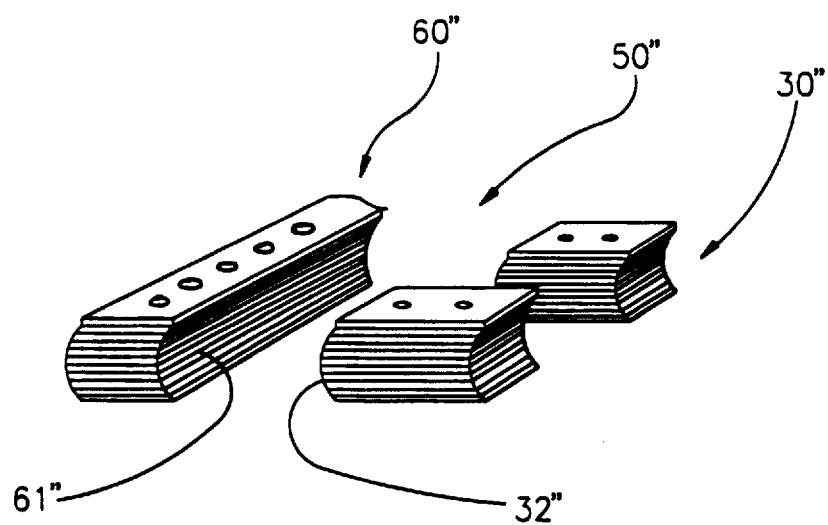
FIG. 7 is a perspective view illustrating primary toothed sections and a yoke of a cylindrical linear motor according to a third embodiment of the present invention.
Figure 8A:
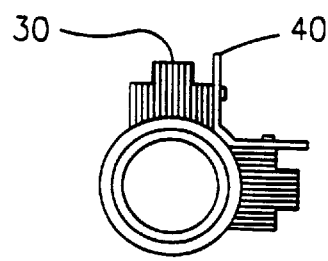
FIG. 8A through 8E are sequential cross-sectional views showing an assembling order of the cylindrical linear motor according to the present invention.
Figure 8B:
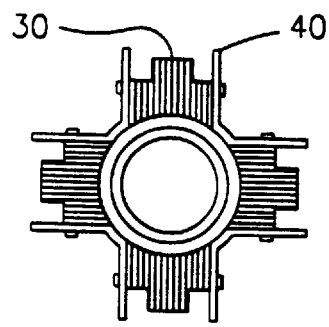
Figure 8C:
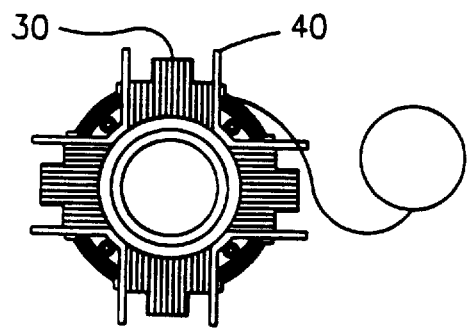
Figure 8D:
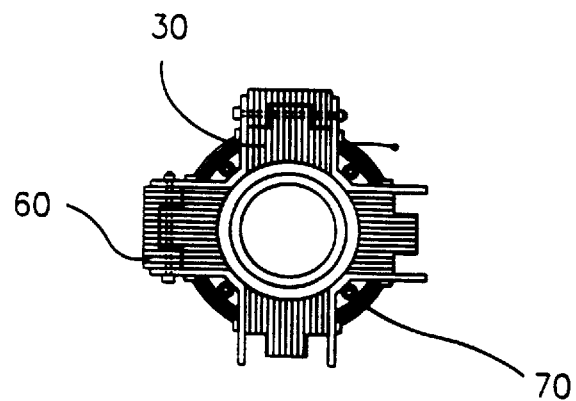
Figure 8E:
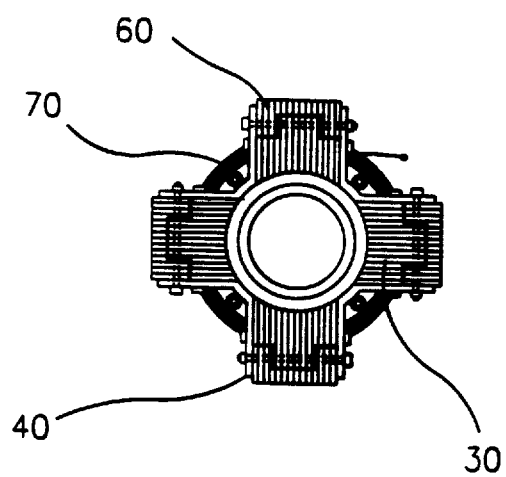

FIG. 7 is a perspective view illustrating a pair of primary toothed sections 32" and a yoke 61" of a cylindrical linear motor according to a third embodiment of the present invention.

As shown therein, an engaging portion 32" of each primary toothed section 30" is formed to be convex-arcuate, and an engaging portion 61" of the yoke 60" is formed to be concave-arcuate for being engaged with the engaging portions 32" of the primary toothed sections 30".

The primary toothed sections 30, 30' and 30" and the yokes 60, 60' and 60" are fixed to the supporting members 40 by bolts 80 and nuts 81, and the secondary iron core 90 is formed to be rod-shaped and is covered with an aluminum conductive material 91.

The assembling order of the cylindrical linear motor 100 according to the present invention will now be explained with reference to FIGS. 8A through 8E.

First, a plurality of the primary toothed sections 30 are fixed to the right-angled engaging arms 42 of the supporting member 40 by using the bolts 80 and the nuts 81. The mounting holes 34 in the primary toothed sections 30 are aligned with the mounting holes 43 in the arms 42 of the supporting member 40. In addition, the primary toothed sections 30 and the arms 42 of the supporting member 40 are matched with each other.

Thereafter, another supporting member 40 is inserted between the primary toothed sections 30 which are not engaged to each other, for thus engaging the primary toothed sections 30 and the engaging arm 42.

The coils 70 are wound in the slots formed between the primary toothed sections 30 fixed to the engaging arms 42, and the yokes 60 are inserted onto the primary toothed sections 30.

The protrusions 33 of the primary toothed sections 30 are inserted into the longitudinal grooves 62 of the yokes 60.

The yokes 60 are engaged with the engaging arms of the supporting members 40 by using the bolts 80 and the nuts 81, for thus forming one assembly which includes the primary toothed sections 30, the supporting members 40, the coils 70 and the yokes 60.

The secondary iron core 90 is inserted into the assembly, for thus finishing the assembling process.

Since the operation of the cylindrical linear motor 100 according to the present invention is the same as the conventional cylindrical linear motor 20, the description thereon will be omitted except for the following.

First, the pipe 41 of the supporting member 40 serves to prevent the coils 70 from being bent toward the primary toothed sections 30 and widens the contact area between the coils 70 and the air, for thus more effectively radiating the heat from the coils 70.

In addition, the pipe 41 supports the primary iron cores 50 fixed to the engaging arms 42.

The primary toothed sections 30' and 30" and the yokes 60' and 60", as shown in FIGS. 6 and 7, are assembled in the above-described method. However, the primary toothed sections 30' and 30" and the yokes 60' and 60" are arcuately or straightly engaged.

As described above, the primary toothed sections are engaged to the supporting member 40, and then the coils 70 are wound between the primary toothed sections, so that it is possible to freely select the coils 70, for thus preventing damage to the coils 70. In addition, the coils 70 have a predetermined spacing with respect to the secondary iron core 90 due to the pipes 41 of the supporting members 40, so that the contact area between the coils 70 and air is increased, for thus more effectively radiating heat from the coils 70, whereby it is possible to enhance the performance of the motor.

In addition, since the engaging arms 42 are supported by the pipes 41 of the supporting members 40, it is possible to more easily increase the number of the engaging arms 42, and in addition it is possible to adjust the width of the slots, whereby various motors having different size can be easily manufactured.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A cylindrical linear motor having individually toothed laminated primary cores, comprising:

a primary iron core assembly having a yoke and primary toothed sections separate from the yoke;

a supporting member supported by the primary iron core assembly and having
a pipe having a predetermined length;
a plurality of right-angled spaced-apart engaging arms fixed to an outer circumferential surface of the pipe; and
a plurality of first engaging holes formed in each engaging arm;

coils wound onto the supporting member and the primary iron core assembly; and a stationary secondary iron core inserted into the primary iron core assembly.

2. The motor of claim 1, wherein said pipe radiates heat generated by the coils wound onto the engaging arm and on the pipe of the supporting member and the primary toothed section.

3. The motor of claim 1, wherein said pipe prevents the coils wound onto the engaging arm of the supporting member and the primary toothed section from being bent toward the secondary iron core.

4. A cylindrical linear motor having individually toothed laminated primary cores, comprising:

a plurality of primary iron core assemblies, each primary iron core assembly having a yoke and primary toothed sections separate from the yoke;

supporting members supported by the primary iron core assemblies, each supporting member having
a pipe having a predetermined length;
a plurality of right-angled spaced-apart engaging arms fixed to an outer circumferential surface of the pipe; and
a plurality of first engaging holes formed in each engaging arm;

coils wound onto the supporting members and the primary iron core assemblies; and a stationary secondary iron core inserted into the primary iron core assemblies.

* * * * *